United States Patent
Kim et al.

(10) Patent No.: US 10,825,185 B2
(45) Date of Patent: Nov. 3, 2020

(54) METHOD AND APPARATUS FOR PERFORMING SEGMENTATION OF SMALL OBJECTS WITHIN MOVING PICTURES IN REAL-TIME

(71) Applicant: ELECTRONICS AND TELECOMMUNICATIONS RESEARCH INSTITUTE, Daejeon (KR)

(72) Inventors: Kwang Yong Kim, Sejong (KR); Sang Joon Park, Sejong (KR); Gi Mun Um, Seoul (KR); Chang Eun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 132 days.

(21) Appl. No.: 16/203,417

(22) Filed: Nov. 28, 2018

(65) Prior Publication Data

US 2019/0347804 A1    Nov. 14, 2019

(30) Foreign Application Priority Data

May 14, 2018    (KR) .................. 10-2018-0055117

(51) Int. Cl.
G06K 9/62         (2006.01)
G06T 7/194        (2017.01)
G06T 7/174        (2017.01)

(52) U.S. Cl.
CPC ............ *G06T 7/194* (2017.01); *G06K 9/6202* (2013.01); *G06K 9/6257* (2013.01); *G06T 7/174* (2017.01);
(Continued)

(58) Field of Classification Search
CPC . G06T 2207/10016; G06T 2207/20021; G06T 2207/20081; G06T 2207/20084;
(Continued)

(56) References Cited

U.S. PATENT DOCUMENTS

2003/0081836 A1*  5/2003  Averbuch ................ G06T 7/215
                                                              382/199
2009/0226044 A1*  9/2009  Ngan .................... G06K 9/6257
                                                              382/115
(Continued)

FOREIGN PATENT DOCUMENTS

KR    10-1648208 B1    8/2016
KR    10-1803471 B1    12/2017
(Continued)

OTHER PUBLICATIONS

Hyeonwoo Noh et al., "Learning Deconvolution Network for Semantic Segmentation", ICML 2016, May 17, 2015, pp. 1-10.
(Continued)

*Primary Examiner* — Gabriel I Garcia

(57) ABSTRACT

The present invention relates to a method and apparatus for performing object segmentation in an image. More particularly, the present invention divides a screen of an input image into at least two sub-images, and generates one image by combining the at least two sub-images to which an image segmentation algorithm is respectively applied.

20 Claims, 13 Drawing Sheets

(52) U.S. Cl.
CPC ............. *G06T 2207/10016* (2013.01); *G06T 2207/20021* (2013.01); *G06T 2207/20081* (2013.01); *G06T 2207/20084* (2013.01); *G06T 2207/20212* (2013.01)

(58) Field of Classification Search
CPC ........ G06T 2207/20212; G06K 9/6202; G06K 9/6257
USPC ......................................................... 382/157
See application file for complete search history.

(56) References Cited

U.S. PATENT DOCUMENTS

| | | | |
|---|---|---|---|
| 2015/0334398 A1* | 11/2015 | Socek | G06T 7/174 375/240.26 |
| 2017/0199900 A1 | 7/2017 | Lee et al. | |
| 2017/0206646 A1 | 7/2017 | Jung et al. | |
| 2019/0311202 A1* | 10/2019 | Lee | G06K 9/00765 |

FOREIGN PATENT DOCUMENTS

| | | |
|---|---|---|
| KR | 10-2018-0006120 A | 1/2018 |
| KR | 10-1828340 B1 | 2/2018 |

OTHER PUBLICATIONS

Jonathan Long et al., "Fully Conventional Networks for Semantic Segmentation", CVPR 2015, Mar. 8, 2015, pp. 1-10.
Liang-Chieh Chen et al., "Semantic Image Segmentation with Deep Convolutional Nets and Fully Connected CRFs", ICLR 2015, Jun. 7, 2016, pp. 1-14.

* cited by examiner

FIG. 11
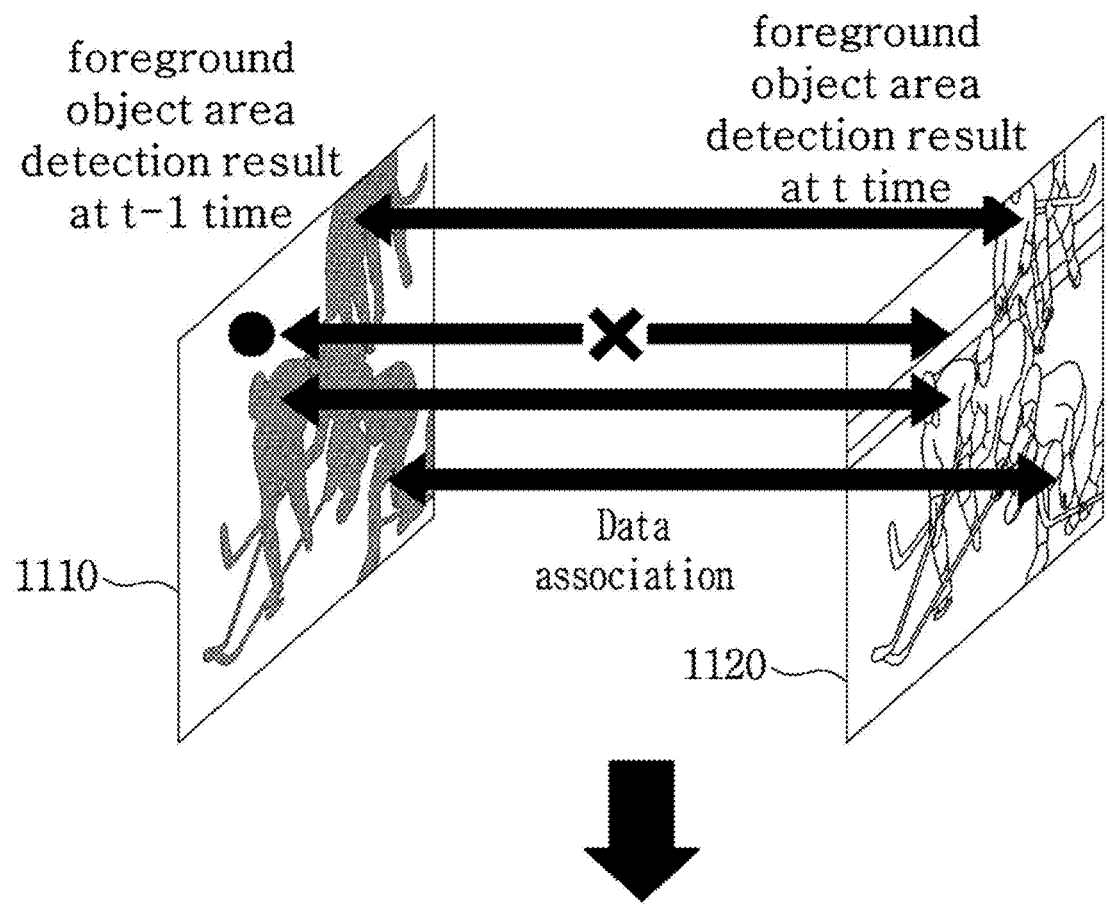
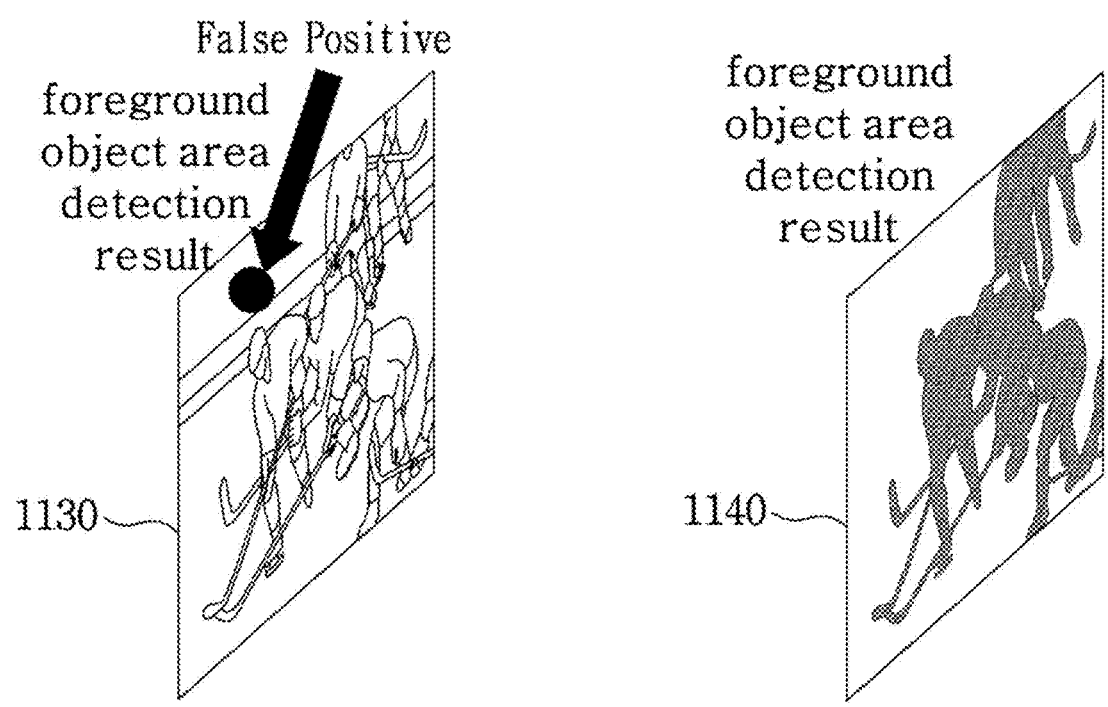

//...

METHOD AND APPARATUS FOR PERFORMING SEGMENTATION OF SMALL OBJECTS WITHIN MOVING PICTURES IN REAL-TIME

CROSS REFERENCE TO RELATED APPLICATION

The present application claims priority to Korean Patent Application No. 10-2018-0055117, filed May 14, 2018, the entire contents of which is incorporated herein for all purposes by this reference.

BACKGROUND OF THE INVENTION

Field of the Invention

The present invention relates to object segmentation within a moving picture, and relates to a method of performing segmentation of small objects within a moving picture in real-time.

Description of the Related Art

Object segmentation or a segmentation technique corresponds to performing segmentation of an object inside of an object boundary (for example: a person, a vehicle, an animal, etc.) present in a foreground within a static image or moving picture.

A convolutional neural network (CNN) based image segmentation algorithm shows great success in segmenting semantic area. Particularly, a fully convolutional network (FCN) shows excellent ability for a semantic segmentation problem by modifying the conventional CNN-based classification architecture into a segmentation architecture.

However, FCN fundamentally generates a label map of a pixel unit by using a linear interpolation method, and thus a grainy segmentation result is generated. Accordingly, performing segmentation of small objects becomes difficult.

Therefore, in order to obtain a fine segmentation result that preserves local details about object boundaries, a conditional random field (CRF) algorithm is additionally used for post-correction. Herein, a number of hyper parameters are used for the same, but in order to obtain a fine segmentation result, such parameters are carefully and manually used.

In addition, post-processing required high calculation cost, for example, segmentation processing speed is very low as time taken for performing segmentation of an object with an image of a resolution of 500×500 is 0.5 seconds.

In order to reduce grainy segmentation, a method of using a deconvolution network is provided. However, a training speed is low since a network structure is configured with a number of layers and parameters.

As described above, in conventional object segmentation and semantic segmentation technique performing fine segmentation of small objects is difficult, a training speed thereof is low due to a deep and a number of network layers, and performing precise segmentation of an object of a foreground within a moving picture in real-time is difficult.

In order to solve the above problem, a method is provided where segmentation of objects within moving picture frames that are consecutively playing is performed while segmentation of small objects within a foreground of a moving picture is performed.

SUMMARY OF THE INVENTION

An object of the present invention is to provide a method and apparatus for processing object segmentation in a precise manner.

Another object of the present invention is to provide a method and apparatus for processing image segmentation in real-time for a foreground object within a moving picture.

Still another object of the present invention is to provide a method and apparatus for performing image segmentation of a small object.

Still another object of the present invention is to provide a method and apparatus for rapidly performing image segmentation.

Still another object of the present invention is to provide a method and apparatus for efficiently performing image segmentation.

Still another object of the present invention is to provide a method and apparatus for efficiently detecting an object.

Still another object of the present invention is to provide a method and apparatus for efficiently recognizing an object.

Still another object of the present invention is to provide a method and apparatus for efficiently tracing an object.

Technical problems obtainable from the present disclosure are not limited by the above-mentioned technical problems, and other unmentioned technical problems may be clearly understood from the following description by those having ordinary skill in the technical field to which the present disclosure pertains.

According to an embodiment of the present invention, a method of performing object segmentation within an image is provided. Herein, a method of performing object segmentation within an image includes: receiving an image; dividing a screen of the input image into at least two sub-images; and generating one image by combining each of the at least two sub-images.

Herein, the screen of the input image may be divided such that the sub-images partially overlap, an image segmentation algorithm may be applied to each sub-image, and an image having a size identical to the input image may be generated by combining the sub-images to which the image segmentation algorithm is applied.

In addition, embodiments below may be commonly applied to a method and apparatus for performing object segmentation within an image.

According to an embodiment of the present invention, for a first frame and a second frame of the input image, the first frame may be a frame that temporally precedes the second frame, a first object included in each of the first frame and the second frame may be determined, and an intersection range of between the first objects respectively included in the first frame and the second frame may be calculated.

According to an embodiment of the present invention, the first frame may be an image generated by combining the sub-images to which the image segmentation algorithm is applied, and the second frame may be the input image.

According to an embodiment of the present invention, the first frame and the second frame of the input image may be two temporally consecutive frames of the input image.

According to an embodiment of the present invention, the intersection range of the first objects respectively included in the first frame and the second frame may be calculated by performing data association matching of a pixel unit.

According to an embodiment of the present invention, when the calculated intersection range between the first objects is equal to or greater than a first threshold value, the first object of the second frame may be determined as a foreground area. In addition, when the calculated intersection range between the first objects is smaller than a first threshold value, the first object of the second frame may be removed from a foreground area.

According to an embodiment of the present invention, the image segmentation algorithm may be a fully convolutional network.

According to an embodiment of the present invention, when the image segmentation algorithm is applied to each sub-image, training for fine-tuning may be performed by using a data set.

According to an embodiment of the present invention, the data set may be configured with a training image and a reference target image (ground truth), wherein the reference target image may be an image in which a foreground area and a background area of the training image are represented by being separated in black and white.

According to an embodiment of the present invention, training for the fully convolutional network may be performed by performing the pre-training using the data set.

According to the present invention, there is provided a method and apparatus for performing precise segmentation of an object.

According to the present invention, there is provided a method and apparatus for performing image segmentation in real time of an object of a foreground within a moving picture.

According to the present invention, there is provided a method and apparatus for performing image segmentation of small objects.

According to the present invention, there is provided a method and apparatus for rapidly performing image segmentation.

According to the present invention, there is provided a method and apparatus for efficiently performing image segmentation.

According to the present invention, there is provided a method and apparatus for efficiently detecting an object.

According to the present invention, there is provided a method and apparatus for efficiently recognizing an object.

According to the present invention, there is provided a method and apparatus for efficiently tracing an object.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The above and other objects, features and other advantages of the present invention will be more clearly understood from the following detailed description when taken in conjunction with the accompanying drawings, in which:

FIG. 11 is a view of detecting and error correction of a foreground area;

DETAILED DESCRIPTION OF THE INVENTION

Figure 1:
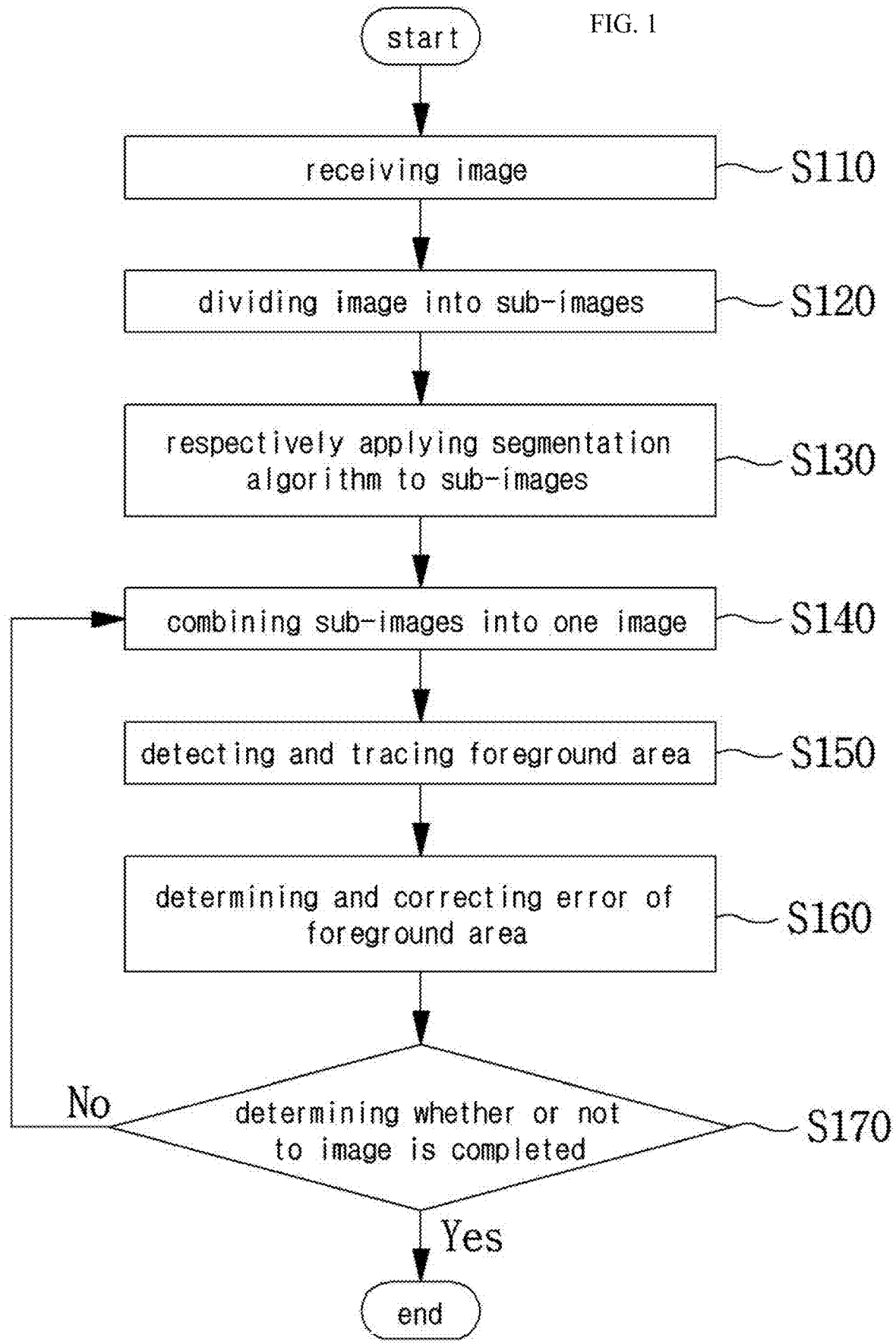
FIG. 1 is a view of a flowchart of a method of performing segmentation (object segmentation) within an image.

Hereinafter, exemplary embodiments of the present invention will be described more fully with reference to the accompanying drawings so as to be easily practiced by those skilled in the art to which the present invention pertains. However, the present invention is not limited to exemplary embodiments described therein, but may also be embodied in other forms.

In addition, parts irrelevant to description are omitted in the drawings in order to clearly explain embodiments of the present invention. Similar parts are denoted by similar reference numerals throughout this specification.

Throughout this specification, it will be understood that when an element is referred to as being "connected" or "coupled" to another element, it can be directly connected or coupled to the other element or intervening elements may be present. In addition, when any part "includes" or "contains" any element, this means that another element is not excluded but may be further included unless otherwise specifically mentioned.

Throughout this specification, the terms such as "first", "second", etc. may be used to describe various components throughout this specification and the claims that follow but the elements should not be limited by the terms. The terms may be used only for discriminating one element from others. Accordingly, within the scope of the present invention, a second element could be termed a first element without departing from the teachings of the present inventive concept, and similarly a first element could be also termed a second element.

In the present invention, the components described in the various embodiments are not necessarily essential components, and some may be optional components. Accordingly, embodiments consisting of a subset of the components described in one embodiment are also included in the scope of the present invention. Also, embodiments that include other components in addition to the components described in the various embodiments are also included in the scope of the present invention.

The present invention relates to object segmentation within a moving picture, and relates to a method of performing segmentation of small objects within a moving picture in real time. More particularly, in conventional object segmentation and a semantic segmentation technique performing segmentation of small objects is difficult, a training speed thereof is low due to a deep and number of network layers, and performing precise segmentation of an object of a foreground within a moving picture in real-time is difficult. Accordingly, in order to solve the above problem, a method is provided where segmentation of objects within moving picture frames that are consecutively playing is performed while segmentation of small objects within a foreground of a moving picture is performed.

Hereinafter, embodiments of the present invention will be described with reference to the accompanying drawings.

FIG. 1 is a view of a flowchart of a method of performing segmentation (object segmentation) in an image.

Referring to FIG. 1, in S110, an apparatus for performing segmentation of an object receives an image, and in S120, divides the input image into sub-images. In S130, image segmentation algorithm is applied to each sub-image, and in S140, sub-images are combined into one image. In S150, a foreground area is detected and traced in the combined image. In S160, error determination and correction is performed for a foreground area within the combined image. In S170, when an image is completed, the process is ended. However, when the image is being processed, returning to step S140 of combining an image is performed so as to repeat segmentation of an object.

Figure 2:
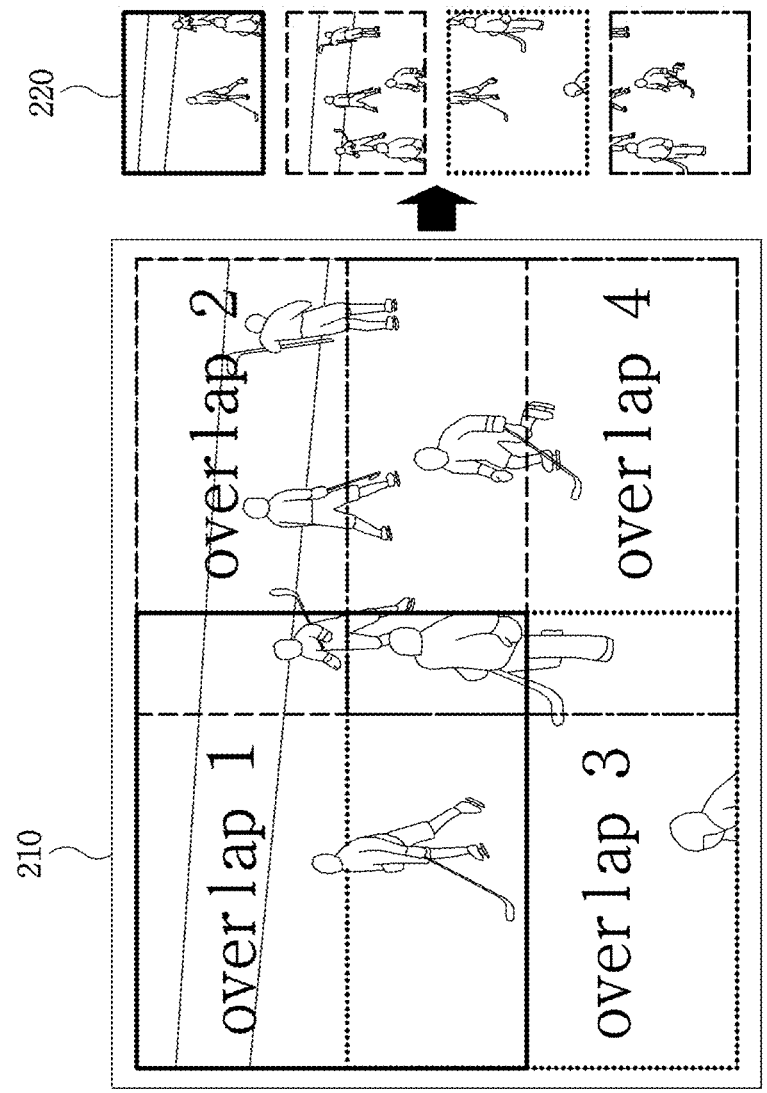
FIG. 2 is a view showing an image obtained by dividing an input image.

FIG. 2 is a view showing an image obtained by dividing an input image.

An input image 210 is divided such that an image segmentation algorithm is applied to sub-images.

Herein, a resolution of the input image 210 and a foreground area within the input image correspond to a predetermined size. In detail, when a resolution of the input image 210 is large, for example, an image of 1920×1080, a result of segmentation may be derived to be faulty. In addition, when a size of an object within the input image 210 is small, a result of object range segmentation may become faulty since the size of the object for which segmentation is performed is small.

When the input image is divided into sub-images 220, the image may be divided such that a partial of areas overlap. A number of sub-images may be designated by a user, and may be a value of equal to or greater than 2.

Referring to FIG. 2, an input image 210 of an ice hockey game is divided into four sub-images 220.

Figure 3:
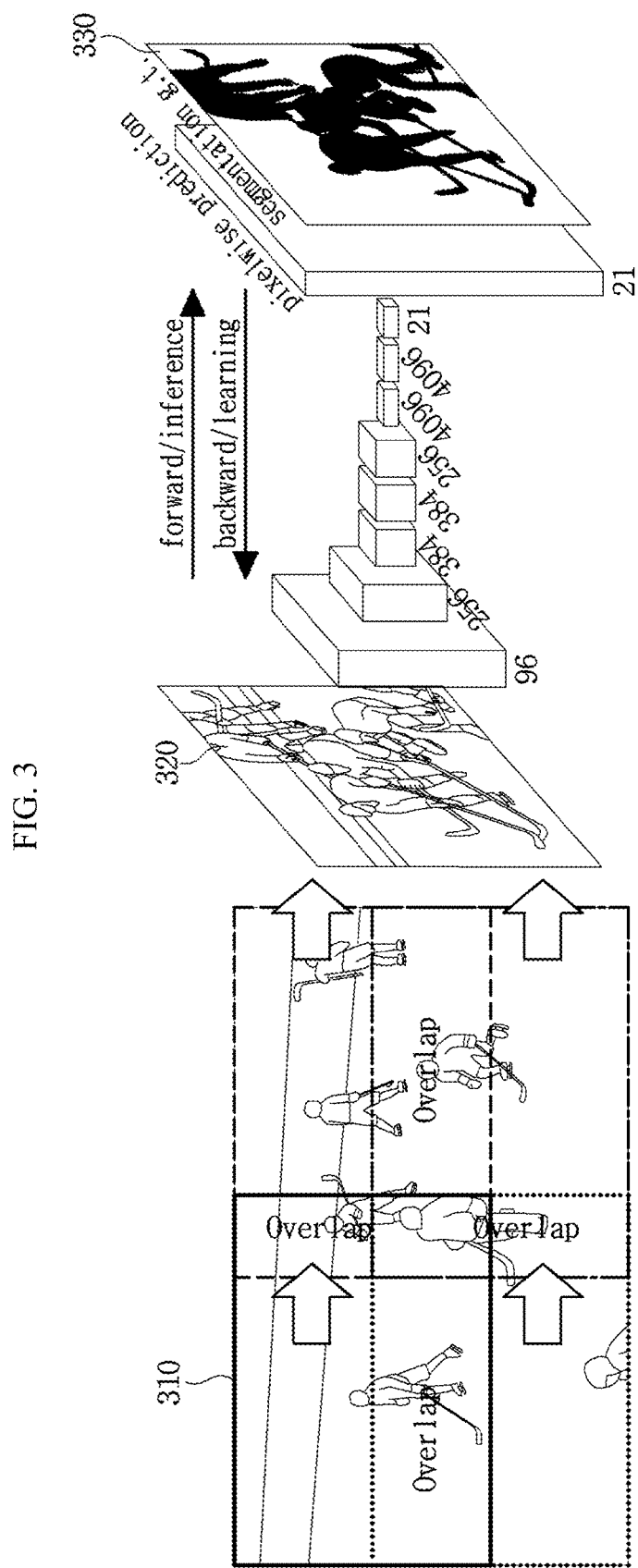
FIG. 3 is a view showing a result of applying an image segmentation algorithm to a sub-image for which dividing is performed.

FIG. 3 is a view showing a result of applying an image segmentation algorithm to a sub-image.

An input image 310 for which segmentation is performed is divided into a plurality of small-size sub-images 320. Subsequently, small-size sub-images partially overlap and then an image segmentation algorithm is applied to each unit of the overlapping small-size sub-images. An image segmentation algorithm according to an embodiment may be a fully convolutional network (FCN), or a convolutional neural network. Herein, an input image is divided into a number of small-size sub-images. Herein, a PNC-based segmentation algorithm may be used as an image segmentation algorithm since the same rapidly outputs an accurate result. By applying an image segmentation algorithm, particularly, by applying a FCN, an image foreground 330 for which segmentation of an object area is performed may be generated.

Herein, an input image is divided into a number of small-size sub-images. Herein, the input image is divided such that sub-images overlap, so that precise segmentation of a foreground object area is available.

Figure 4:
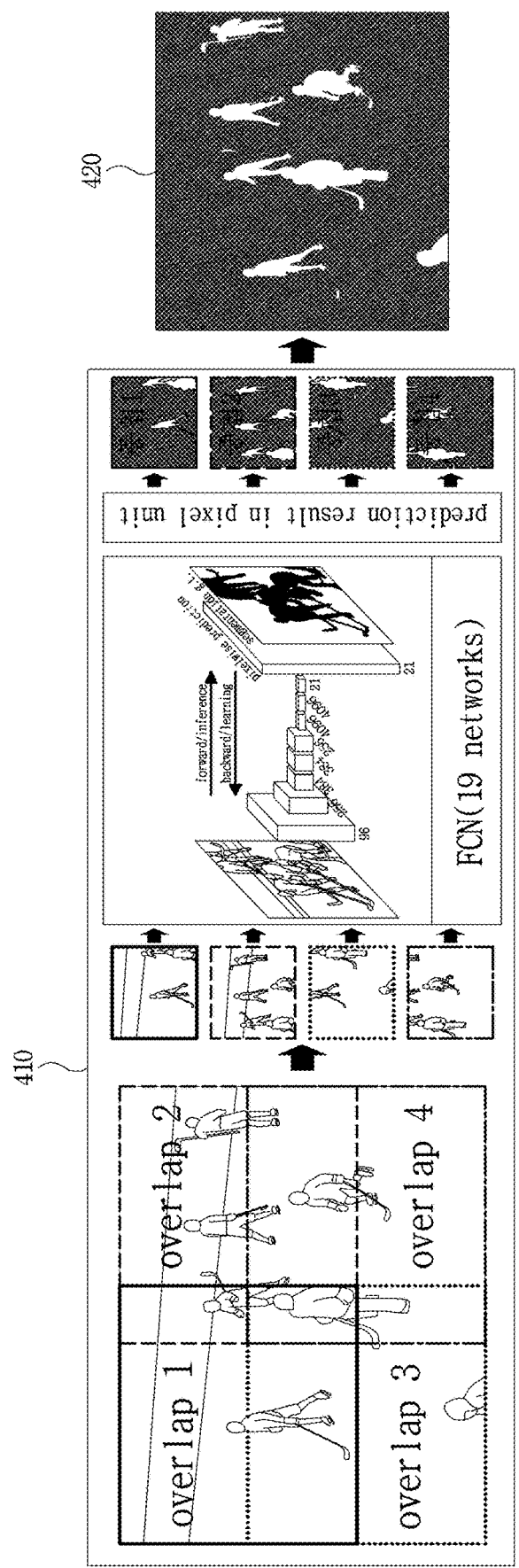
FIG. 4 is a view showing a result where sub-images are combined into one image.

FIG. 4 is a view showing a result where sub-images are combined into one image.

A sub-divided image 410 is integrated into one combined image 420. Herein, the sub-divided image 410 corresponds to an image where segmentation of an object is performed by applying a FNC through steps of FIGS. 2 and 3.

Herein, an image that is integrated into one combined image 420 may be an image having a size identical to an input image, that is, an original image.

Herein, since a size of a sub-image is adjusted rather than using an original image, a size of an object area within the sub-image for which the size is adjusted is greater than a size of an object area within the original image. In detail, a ratio of a foreground object within a sub-image is greater than a ratio of a foreground object within an original image. Accordingly, since segmentation is not performed for a foreground object by directly applying a FCN to an input image (original image), performing precise segmentation of a foreground object is available.

Figure 5:
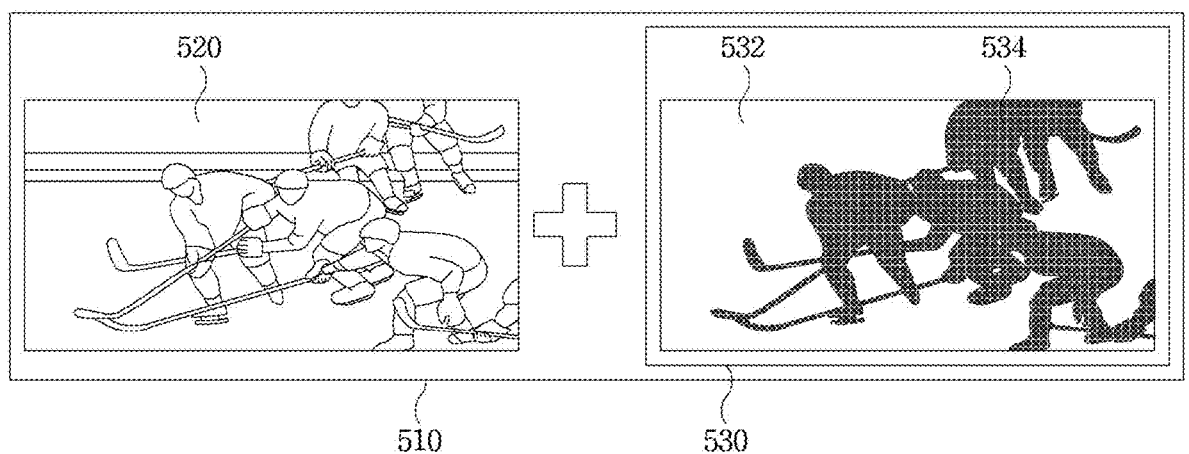
FIG. 5 is a view showing a training data set.

FIG. 5 is a view showing a training data set.

A training data set 510 is configured with a training image 520 and a pair of data pieces of a reference target image 530 (ground truth). Training for FCN fine-tuning may be performed by using a training data set 510.

A training image 520 may be a static image, but may be consecutive image frames.

A reference target image 530 may be an image where a training image 520 is divided into a background area 532 and a foreground area 534. Herein, a reference target image 530 may correspond to an image where a foreground area 534 and a background area 532 are represented by being separated in black and white.

A training data set 510 requires several tens of thousands of sets for FCN training. However, configuring a training data set 510 with several tens of thousands of sets is practically impossible, thus FNC training may be performed by performing pre-training. Herein, according to an embodiment, a training data set 510 may be six thousand, and training for FCN fine-tuning may be performed by using the training data set 510.

According to an embodiment of the present invention, a training data set 510 may be used by using ILSVRC.

Referring to FIG. 5, a training image 510 is an image of an ice hockey game, and a reference target image (ground truth) corresponds to an image where the ice hockey game image is represented by being separated into background and foreground areas (ice hockey player area) in black and white.

Figure 6:
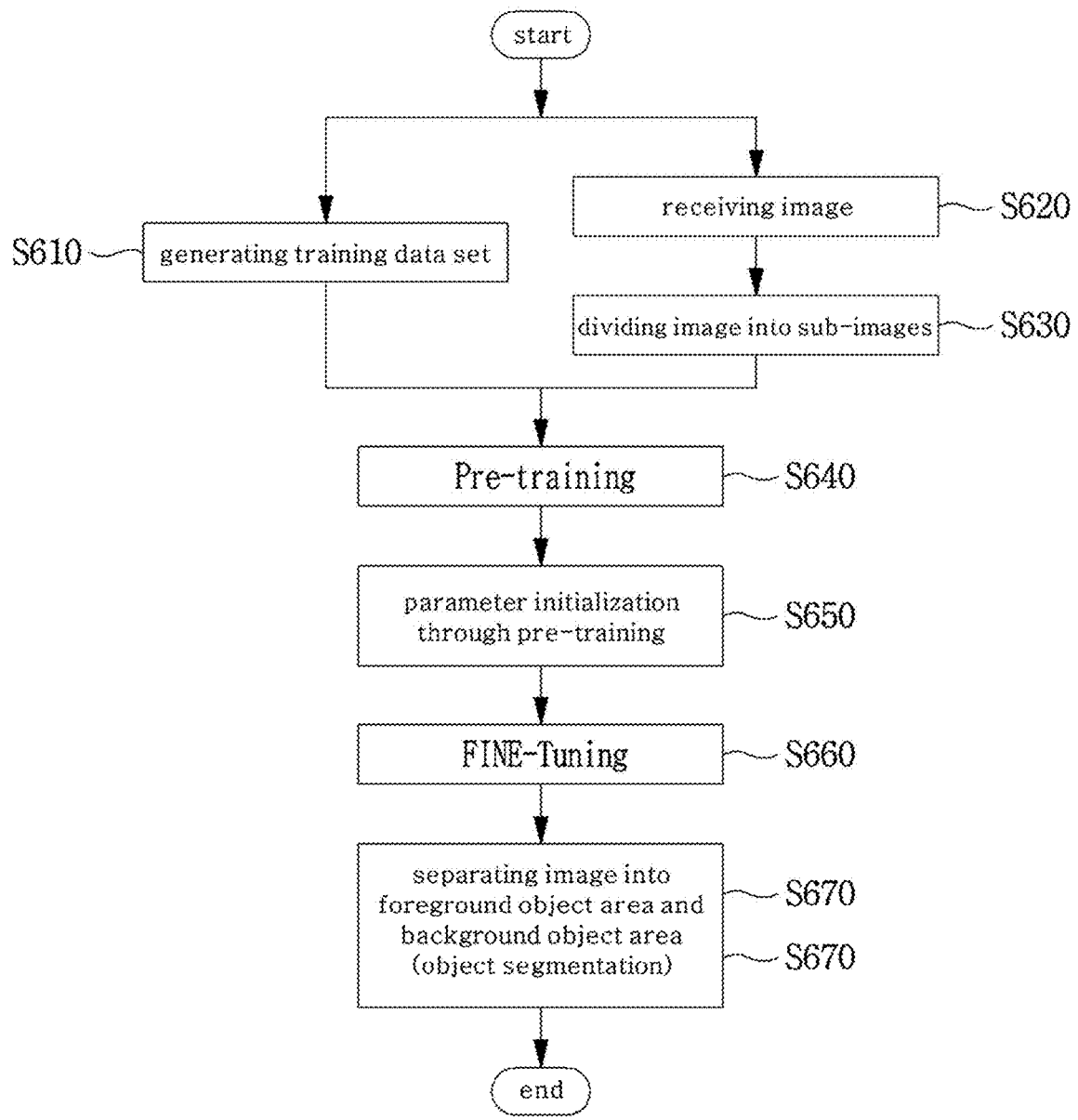
FIG. 6 is a flowchart a process of separating a foreground area and a background area by applying image segmentation.

FIG. 6 is a flowchart showing a process of separating an image into a foreground area and a background area by applying image segmentation.

Figure 7:
FIG. 7 is a view of FCN learning using an ILSVRC learning data set.
Figure 8:
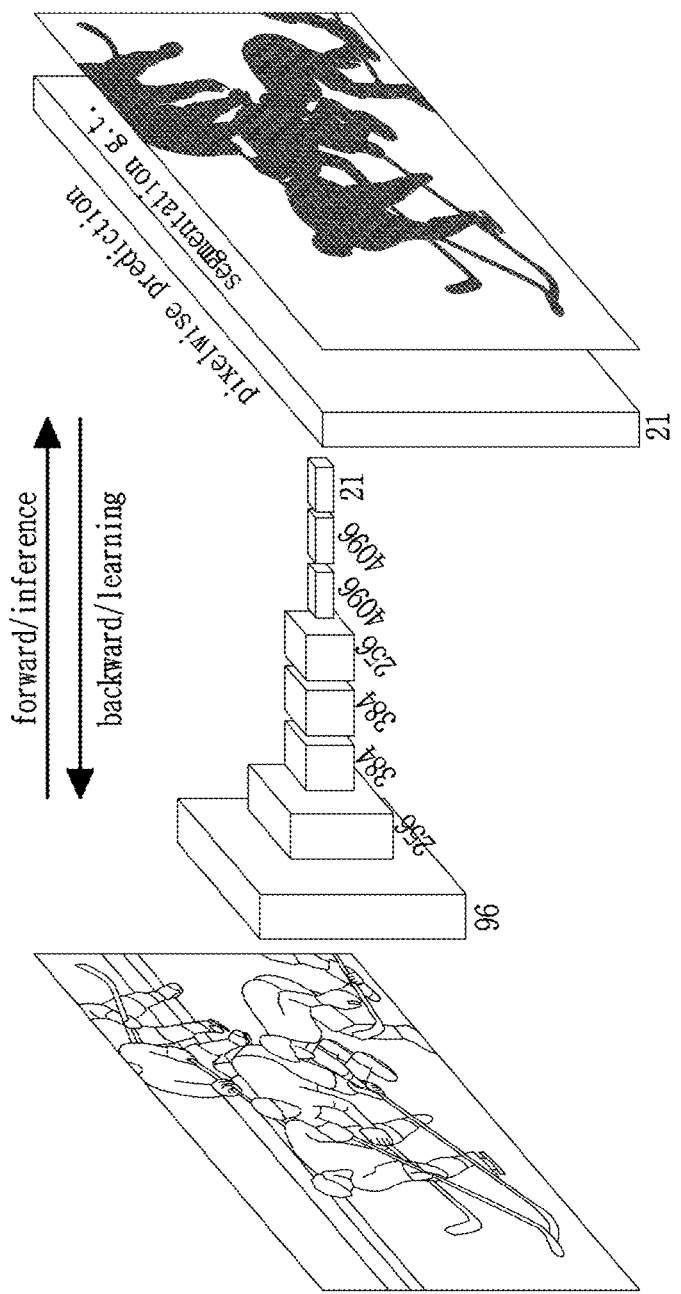
FIG. 8 is a view of initializing a parameter through pre-training.
Figure 9:
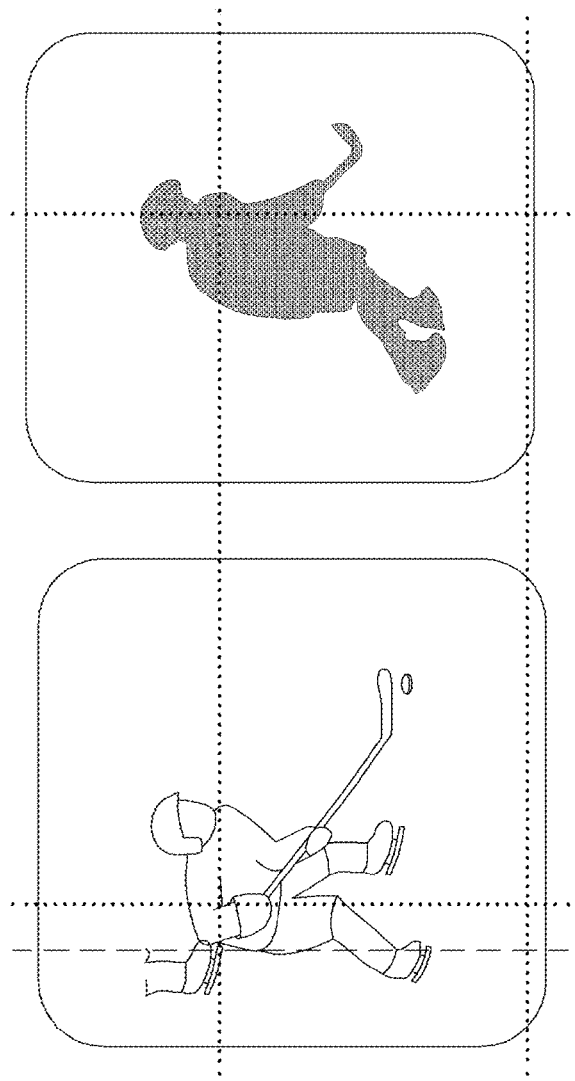
FIG. 9 is a view showing fine-tuning using a learning data set.

FIG. 7 is a view showing FNC training using an ILSVRC training data set, FIG. 8 is a view showing initialization of a parameter through pre-training, and FIG. 9 is a view showing fine-tuning using a training data set.

FIG. 6 is a detailed view of "applying an image segmentation algorithm to each sub-image" of FIG. 1 (S130) and transforming a sub-image 320 of FIG. 3 to an image 330 to which FCN is applied.

In S610, a training data set is generated, and in S620, and S630, an input image is divided. FIG. 7 is a view showing a result screen related to a corresponding process. In detail, FIG. 7 is a view corresponding to FCN training using an ILSVRC training data set.

In S640, pre-training is performed for an input image by using a training data set, and in S650, a parameter is initialized through pre-training. FIG. 8 is a view of a result screen related to a corresponding process. In detail, FIG. 8 is a view corresponding to initializing a parameter through pre-training.

Subsequently, in S660, fine-tuning for the input image is performed. FIG. 9 is a view of a result screen related to a corresponding process, and is a view showing a result of performing fine-tuning by using a training data set.

Subsequently, in S670, an image is generated where the input image is separated into a foreground object area and a background area.

Figure 10:
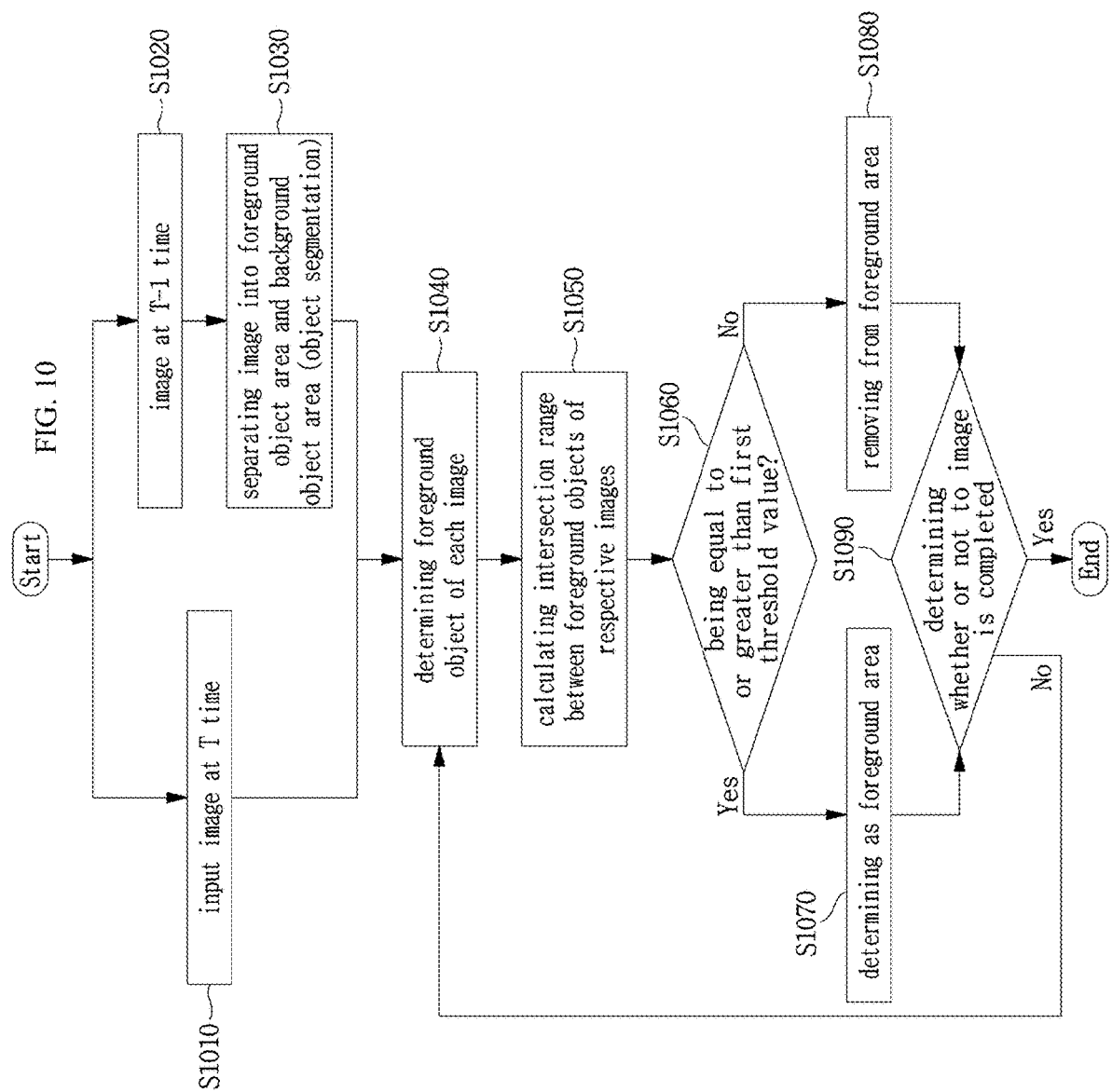
FIG. 10 is a flowchart of detecting and error correction of a foreground area.

FIG. 10 is a flowchart of detecting and error correction of a foreground area.

FIG. 10 is a view of "detecting and tracing a foreground area" of FIG. 1 (S150), and "error determination and correction of a foreground area" (S160).

In S1010, a current frame (hereinafter, referred as a second frame) image is input, and in a S1020, a previous frame (hereinafter, referred as a first frame) image is input. In S1030, separation of a foreground object area and a background area (object segmentation) is performed.

A first frame and a second frame may refer to a frame of the input image. Herein, the first frame means a frame that temporally precedes the second frame. The first frame and the second frame may be temporally consecutive frames, but may be frames with a predetermined time difference therebetween.

A first object may be a specific object traced on a frame. This may be a foreground object. However, the same may be classified into a foreground object or a background object by error determination and correction.

A first threshold value is a value corresponding to a foreground area intersection range obtained by comparing the first frame and the second frame, and is an arbitrary value designated by a user. In detail, a first threshold value may correspond to a value in association with an intersection range where a foreground area intersects between the first frame and the second frame such that a user may accept the corresponding area as a foreground area in the second frame.

In S1040, a first object included in each of the first frame and the second frame is determined. Subsequently, in S1050, an intersection range between the first objects respectively included in the first frame and the second frame is calculated. In S1060, whether or not the calculated intersection range is equal to or greater than a first threshold value is determined.

FIG. 11 is a view of detecting and error correction of a foreground area.

In order to modify a foreground area error, false positive based error determination and compensation for the foreground area are performed after performing tracing between image frames.

Tracing of a foreground area is performed by comparing a foreground object area detection result 1110 in the first frame and a foreground object area detection result 1120 in the second frame. In detail, tracing a foreground object area may be performed in terms of a data association method of a pixel unit when segmentation of a foreground object area is performed for each frame.

Figure 12:
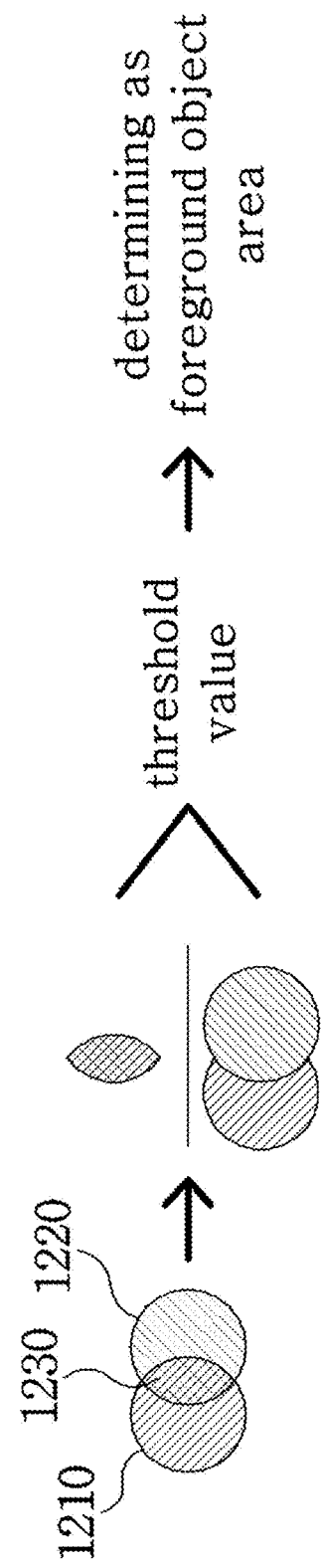
FIG. 12 is a view of a foreground area tracing method.

FIG. 12 is a view of a foreground area tracing method.

In order to determine a foreground object, intersection ranges of a foreground object between two neighbor frames are compared. In other words, a foreground object area 1210 present in the first frame image and a foreground object area 1220 present in the second frame image may be determined. In addition, an IoU (intersection of union) area 1230 of the foreground object area is determined.

Herein, an IoU area 1230 may correspond to intersection ranges of a foreground area between the first frame and the second frame. In detail, the IoU area 1230 may be represented as a ratio of an intersection area occupying in the entire foreground area from the foreground area between the first frame and the second frame. In the following claims, the IoU area 1230 may be called an intersection range between the first objects respectively included in the first frame and the second frame.

The corresponding IoU 1230 and a size of the first threshold value are compared.

By comparing the IoU and the first threshold value, for an area where a size of the IoU is equal to or greater than the first threshold value is determined as a foreground object area. Otherwise, it is regarded as false positive, the IoU is removed from a result of a final object segmentation area, and error determination and correction are repeatedly performed by performing tracing for a following frame.

For example, when an area for which wrong segmentation is performed for an ice hockey player area is included in a 268-th frame (second frame) which is a current frame, tracing and correction for a foreground area are performed. Since a player area of a 267-th frame (first frame) that is a previous frame is segmented as a background, a 268-th area (second frame) that is a current frame is regarded as false positive, and the corresponding part is removed from a foreground object area.

Herein, in an embodiment, for a case where a predetermined time distance is present between two consecutive frames rather than two adjacent frames, application may be found. In detail, a frame at a t time and a frame at a t+a time may be compared. Herein, a means that a predetermined frame length time has elapsed.

When a value of an IoU is determined to be an area greater than a threshold value by comparing two frames, it may be extended to determine as a foreground object area. In other words, by comparing whether foreground object areas are not being consecutive, determining whether or not to expand a foreground object area is possible.

Figure 13:
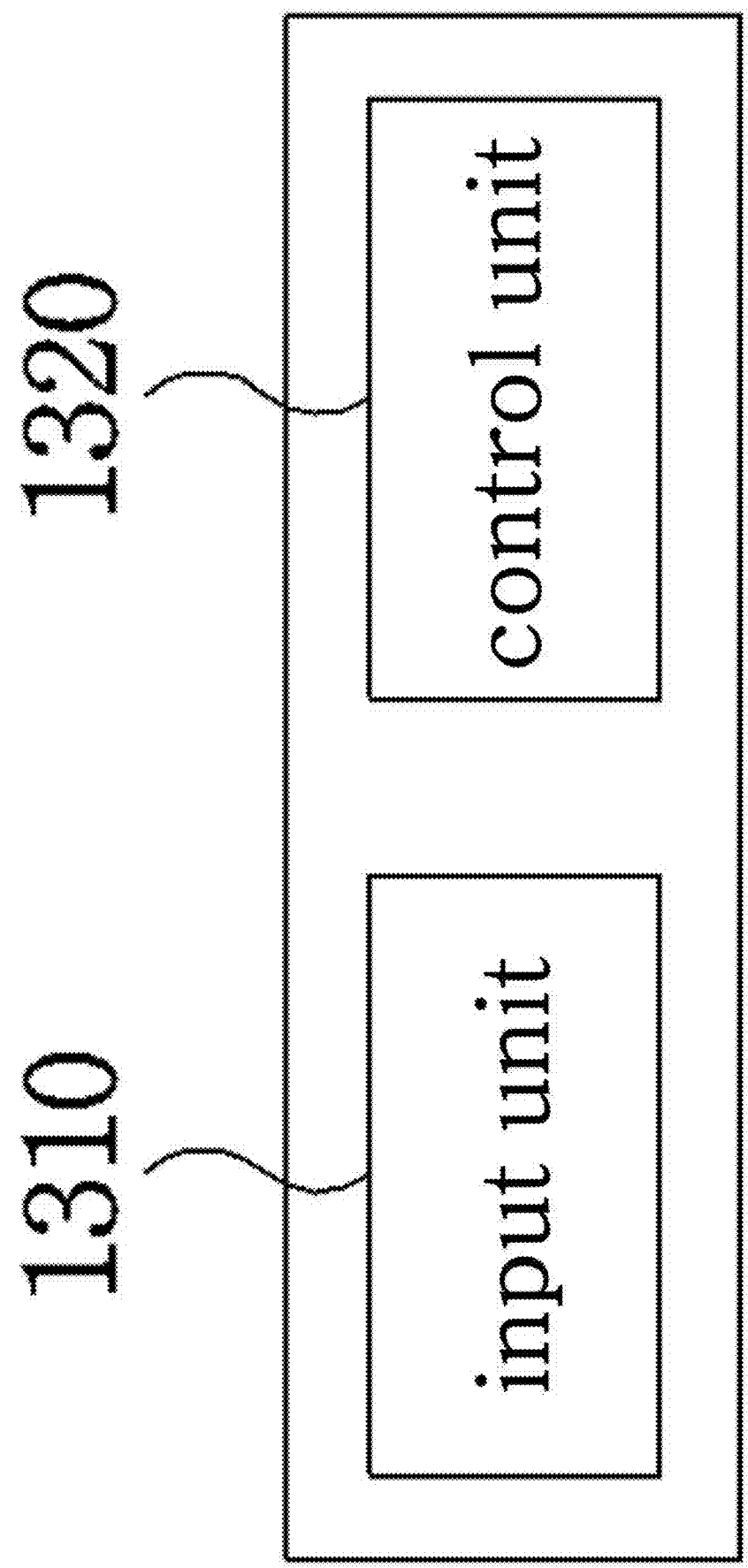
FIG. 13 is a view of an apparatus for performing segmentation (object segmentation) in an image.

FIG. 13 is a view of an apparatus for object performing segmentation within an image.

The apparatus for performing object segmentation in an image includes an image input unit 1310 and a control unit 1320 controlling the image input unit.

The control unit 1320 receives an image, divides a screen of the input image into at least two sub-images, and generates one image by respectively combining the at least two sub-images. Sub-images obtained by dividing the screen are divided so as to have a part overlapping between the screens. The control unit 1320 applies an image segmentation algorithm to each sub-image, and generates an image having a size identical to the input image by combining sub-images to which an image segmentation algorithm is applied.

A first frame and a second frame in the input image, the first frame may be a frame that temporally precedes the second frame.

The control unit 1320 may determine a first object included in each of a first frame and a second frame, and calculate an intersection range between first objects respectively included in the first frame and the second frame.

In detail, the control unit 1320 may determine an intersection range of the first objects respectively included in the first frame and the second frame by performing data association matching of a pixel unit.

Herein, when the calculated intersection range between the first objects is equal to or greater than a first threshold value, the first object of the second frame may be determined as a foreground area. Otherwise, when the calculated intersection range between the first objects is smaller than the first threshold value, the first object of the second frame may be removed from the foreground area.

In an embodiment, an image segmentation algorithm may be a fully convolutional network.

The control unit 1320 may perform fine-tuning by using a data set when an image segmentation algorithm is applied to each sub-image.

Herein, a data set may be configured with a training image and a reference target image (ground truth), and the reference target image may be an image where a foreground area and a background area of the training image are represented by being separated in black and white. In an embodiment, training for a fully convolutional network may be performed by performing pre-training using a data set.

The present invention uses a data association method of a pixel unit, and thus the present invention may be the most efficient invention in terms of fragmentation speed. In addition, since a simple calculation algorithm is used where a wrong foreground object area is removed by using false positive determination by performing tracing of a foreground object area over time, real-time segmentation for a small object area within an image frame may be performed.

What is claimed is:

1. A method of performing object segmentation, wherein an object within an image is segmented, the method comprising:
   receiving an input image;
   dividing a screen of the input image into at least two sub-images; and
   generating at least one image by combining each of the at least two sub-images, wherein the screen of the input image is divided such that the sub-images partially overlap, wherein the generating the at least one image generates the at least one image having a resolution identical to the resolution of the input image by applying an image segmentation algorithm to each of the at least two sub-images, and combining the at least two sub-images to which the image segmentation algorithm is applied.

2. The method of claim 1, wherein for a first frame and a second frame of the input image, the first frame is a frame that temporally precedes the second frame, a first object included in each of the first frame and the second frame is determined, and an intersection range of between the first objects respectively included in the first frame and the second frame is calculated.

3. The method of claim 2, wherein the first frame is an image generated by combining the sub-images to which the image segmentation algorithm is applied, and the second frame is the input image.

4. The method of claim 2, wherein the first frame and the second frame of the input image are two temporally consecutive frames of the input image.

5. The method of claim 2, wherein, the intersection range of the first objects respectively included in the first frame and the second frame is calculated by performing data association matching of a pixel unit.

6. The method of claim 2, wherein when the calculated intersection range between the first objects is equal to or greater than a first threshold value, the first object of the second frame is determined as a foreground area.

7. The method of claim 2, wherein when the calculated intersection range between the first objects is smaller than a first threshold value, the first object of the second frame is removed from a foreground area.

8. The method of claim 1, wherein the image segmentation algorithm is a fully convolutional network.

9. The method of claim 1, wherein when the image segmentation algorithm is applied to each of the at least two sub-images, training for fine-tuning is performed by using a data set.

10. The method of claim 9, wherein the data set is configured with a training image and a reference target image (ground truth), wherein the reference target image is an image in which a foreground area and a background area of the training image are represented by being separated in black and white.

11. The method of claim 9, wherein training for the fully convolutional network is performed by performing the pre-training using the data set.

12. An apparatus for performing object segmentation, an object within an image is segmented, the apparatus comprising:
    an image input unit; and
    a control unit controlling the image input unit, wherein the control unit:
    receives an input image;
    divides a screen of the input image into at least two sub-images;
    generates the at least one image by combining each of the at least two sub-images, the screen of the input image being divided such that the sub-images partially overlap;
    wherein the control unit generates the at least one image having a resolution identical to a resolution of the input image by applying an image segmentation algorithm to each of the at least two sub-images, and combining the at least two sub-images to which the image segmentation algorithm is applied.

13. The apparatus of claim 12, wherein for a first frame and a second frame of the input image, the first frame is a frame that temporally precedes the second frame, wherein a first object included in each of the first frame and the second frame is determined, and an intersection range between the first objects respectively included in the first frame and the second frame is calculated.

14. The apparatus of claim 13, wherein, the intersection range between the first objects respectively included in the first frame and the second frame is calculated by performing data association matching of a pixel unit.

15. The apparatus of claim 13, wherein when the calculated intersection range between the first objects is equal to or greater than a first threshold value, the first object of the second frame is determined as a foreground area.

16. The apparatus of claim 13, wherein when the calculated intersection range between the first objects is smaller than a first threshold value, the first object of the second frame is removed from a foreground area.

17. The apparatus of claim 12, wherein the image segmentation algorithm is a fully convolutional network.

18. The apparatus of claim 12, wherein when the image segmentation algorithm is applied to each of the at least two sub-images, training for fine-tuning is performed by using a data set.

19. The apparatus of claim 18, wherein the data set is configured with a training image and a reference target image (ground truth), wherein the reference target image is an image in which a foreground area and a background area of the training image are represented by being separated in black and white.

20. The apparatus of claim 19, wherein training for fully convolutional network is performed by performing the pre-training using the data set.

* * * * *